Sept. 2, 1941.    E. H. SMITH    2,254,758

PROCESS OF MAKING TORCH TIPS

Filed Feb. 8, 1940

INVENTOR
ELMER H. SMITH
By Paul, Paul & Moore
ATTORNEYS

Patented Sept. 2, 1941

2,254,758

UNITED STATES PATENT OFFICE 2,254,758

PROCESS OF MAKING TORCH TIPS

Elmer H. Smith, Minneapolis, Minn., assignor to Smith Welding Equipment Corporation, Minneapolis, Minn., a corporation of Minnesota Application February 8, 1940, Serial No. 317,869

3 Claims. (Cl. 29—157)

This invention relates to new and useful improvements in the manufacture of torch tips of the general character disclosed in my co-pending applications, Serial Numbers 282,750 and 282,751, filed July 3, 1939.

The torch tip disclosed in the present application is made from a single blank of ductile metal which may be of stock size. The process of making the torch tip herein shown distinguishes from the processes disclosed in the above mentioned applications in that certain of the longitudinally extending passages in the finished torch tip are formed by longitudinally grooving the periphery of the blank at spaced intervals around the circumference thereof, and then placing wire elements in said grooves and swaging the blank to firmly press the walls of each groove into sealing engagement with each other, after which the wire elements are removed from the blank in a manner similar to the wire elements used in the formation of the tips disclosed in the aforementioned pending applications.

An object of the present invention therefore is to provide a simple process of forming a torch tip from a single blank of ductile metal which consists in cutting a plurality of longitudinally extending tangential grooves in the periphery of the blank, and placing a wire element in the bottom of each groove and swaging the blank until the walls of the grooves are firmly pressed into contact with the peripheries of the wire elements, after which the wire elements are removed from the blank.

A further object is to provide a simple and inexpensive method of forming a torch tip which does not require the drilling of a plurality of small holes through the length of the tip body, prior to the swaging of the blanks to complete the formation of the tip.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

Figure 1:
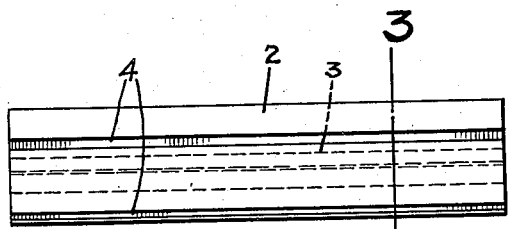
Figure 1 is a view showing the blank, after having its periphery longitudinally grooved.
Figure 1A:
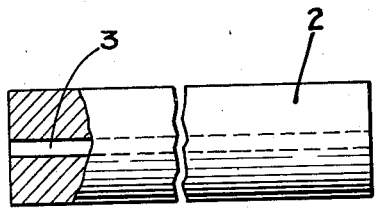
Figure 1A is a view showing a blank of stock material provided with a central bore.
Figure 3:
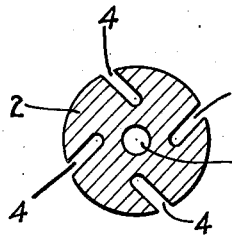
Figure 3 is a cross-sectional view on the line 3—3 of Figure 1.
Figure 4:
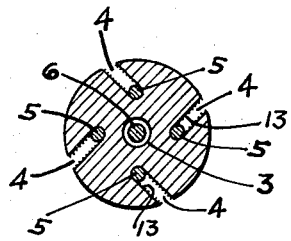
Figure 4 is a cross-sectional view on the line 4—4 of Figure 2.

The novel process herein disclosed is carried out in the following manner. The blank, generally designated by the numeral 2, which eventually becomes the body of the torch tip, may be furnished with a central bore 3, as shown in Figure 1A. A plurality of longitudinally extending grooves 4 are cut in the periphery of the blank at spaced intervals around the circumference thereof, as shown in Figures 3 and 4. The depth of the grooves is substantially greater than the width thereof, and they are preferably disposed at a tangent with respect to the axis of the blank, although, in some instances, they may be cut radially.

Figure 2:
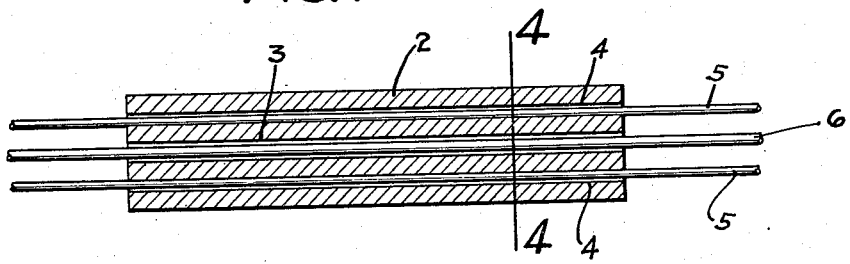
Figure 2 is a view showing a plurality of wire elements supported in the bottoms of the grooves and also showing a wire inserted through the axial bore of the blank.

After the grooves have been cut or formed in the blank 2, as shown in Figure 3, a wire element 5 is placed in the bottom of each groove, and if a central bore 3 is provided in the blank, a wire element 6 is also inserted therein, as shown in Figure 2. If it is desired that the central passage in the finished tip be relatively larger than the outer passages thereof, the wire element 6 is relatively larger than the wires 5.

Figure 5:
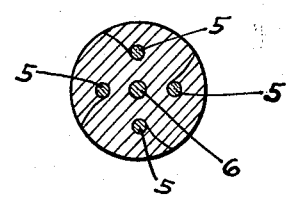
Figure 5 is a cross-sectional view of the partially completed torch tip after the swaging operation.

In the next step in the formation of the tip, the blank 2 with the wire elements 5 and 6 supported in the grooves 4 and bore 3, respectively, thereof, is swaged until the walls of each groove 4 become firmly pressed into sealing engagement with each other, as shown in Figure 5, whereby it will be noted, the wires 5 are completely embedded in the blank. In like manner, the bore 3 of the blank is reduced to the diameter of the wire 6 because of the diameter of the blank being reduced, as a result of the swaging operation. The swaging operation, in addition to reducing the diameter of the blank, also causes it to elongate, as will readily be understood.

Figure 6:
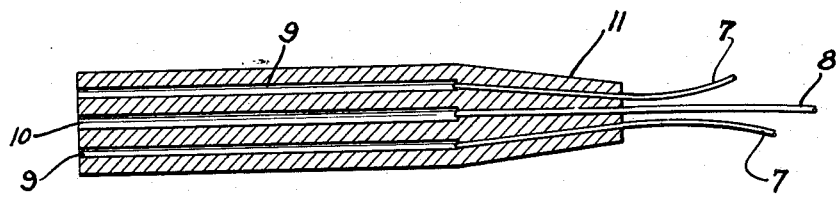
Figure 6 is a view showing the torch tip partially completed.
Figure 7:
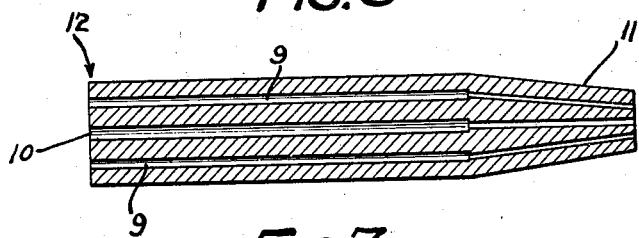
Figure 7 is a view showing the completed tip.

After the blank has been swaged to completely embed the wires 5 and 6 therein, as shown in Figure 5, the wire elements are withdrawn from the blank. If it is desired to taper the discharge end of the finished tip and to reduce the apertures or passages provided therein, as shown in Figure 7, relatively smaller and shorter wire elements 7 and 8 are inserted in the apertures 9 and 10, formed by removal of the wire elements 5 and 6. The partially completed tip is then again subjected to a swaging operation, whereby one end thereof is reduced in diameter and tapered, as shown at 11 in Figures 6 and 7, thereby causing the metal of the partially completed tip to be pressed firmly into contact with the peripheries of the wire elements 7 and 8. The wire elements 7 and 8 are then removed from the tip, whereupon the tip is completed to the form shown in Figure 7. The opposite end 10 of the blank is provided with suitable means, not shown, for attaching the tip in the usual torch head.

The novel process herein disclosed, is extremely simple and inexpensive. The grooves or slots 4 provided in the periphery of the tip may readily be formed by conventional tools at small cost. These grooves are preferably arranged, as shown in Figures 3 and 4, although, in some instances, it may be found desirable to cut the grooves radially instead of tangentially, as shown in the drawing. It may also be found desirable, at times, to cut the grooves with inclined bottoms, whereby the grooves are deeper at one end of the blank than at the other. When thus cut, the second swaging operation may be eliminated, particularly, when one end of the tip is reduced in diameter and tapered. It may also be found desirable in some instances, to apply a suitable bonding material, such as silver solder, to the walls of the grooves 4, prior to the swaging operation, and then after the wire elements have been removed from the blank, the blank may be heated to cause the silver solder to securely bond together the walls of each groove. The silver solder or other bonding material may readily be applied to the faces of the grooved walls in paste form, as indicated at 13 in Figure 4.

In the drawing, I have shown the blank provided with a central bore 3. If the finished torch tip is not required to have a central bore, the blank 2 may be furnished without a central bore 3.

I claim as my invention:

1. A process of forming a torch tip from a blank of ductile metal having an axial bore, which consists in cutting a plurality of longitudinally extending grooves in the periphery of said blank in spaced relation around the circumference of the blank, which grooves are inclined to radii of the blank and their depth being relatively greater than their width, placing a wire element in the bottom of each groove and in said axial bore, swaging the blank until the walls of said grooves and bore are pressed firmly into contact with the peripheries of their respective wire elements, whereby the wire elements become embedded in said blank, and then removing the wire elements from said blank, whereby a plurality of longitudinally extending passages are provided therein.

2. A process of forming a torch tip from a blank of ductile metal, which tip comprises a plurality of longitudinal passages disposed in proximity to the periphery of the finished tip, which consists in cutting a plurality of longitudinally extending grooves in the periphery of the blank at spaced intervals around the circumference of the blank, which grooves are inclined to radii of the blank, placing a wire element in the bottom of each groove, applying a suitable bonding agent to opposite walls of each groove, swaging the blank until the walls of each groove are firmly pressed into sealing engagement with one another, and whereby the diameter of the blank is reduced, and then removing the wire elements from the blank to provide the longitudinally extending passages therein.

3. A process of forming a torch tip from a blank of ductile metal, which tip comprises an axial bore and a plurality of longitudinal passages disposed in proximity to the periphery of the finished tip, which consists in cutting a plurality of longitudinally extending grooves in the periphery of the blank at equi-spaced intervals around the circumference of the blank, which grooves are inclined to radii of the blank to increase the surface areas of the opposed walls of each groove, placing a wire element in the bottom of each groove and inserting a wire element through said bore, applying silver solder to opposite walls of each groove, swaging the blank until the walls of each groove are firmly pressed into contact with one another in bonding relation, and whereby the diameter of the blank is reduced, and then removing the wire elements from the blank, whereby a plurality of longitudinally extending passages are provided therein.

ELMER H. SMITH.